(12) United States Patent
Nowlan et al.

(10) Patent No.: US 6,204,848 B1
(45) Date of Patent: Mar. 20, 2001

(54) DATA ENTRY APPARATUS HAVING A LIMITED NUMBER OF CHARACTER KEYS AND METHOD

(75) Inventors: Steven Nowlan, San Jose; Ali Ebrahimi, Belmont; David Richard Whaley, Redwood City; Pierre Demartines; Sreeram Balakrishnan, both of San Francisco; Sheridan Rawlins, Sunnyvale, all of CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/291,344

(22) Filed: Apr. 14, 1999

(51) Int. Cl.[7] .............................. G06F 3/023; H03K 17/94
(52) U.S. Cl. .............................................. 345/352; 341/22
(58) Field of Search ..................... 345/326, 348, 345/352, 353, 168, 169, 171; 707/530, 534; 708/142, 145; 341/22, 23

(56) References Cited

U.S. PATENT DOCUMENTS

| | | | |
|---|---|---|---|
| 5,706,450 | * | 1/1998 | Shaiman et al. .................... 345/326 |
| 5,818,437 | | 10/1998 | Grover et al. ........................ 345/326 |
| 5,847,697 | * | 12/1998 | Sugimoto ............................. 345/168 |
| 5,911,485 | * | 6/1999 | Rossmann ............................ 341/22 |
| 5,952,942 | * | 9/1999 | Balakrishnan et al. ................ 341/20 |
| 5,953,541 | * | 9/1999 | King et al. .............................. 710/67 |
| 6,005,495 | * | 12/1999 | Connolly et al. ...................... 341/22 |
| 6,011,554 | * | 1/2000 | King et al. ............................. 345/352 |

OTHER PUBLICATIONS

Probabilistic Character Disambiguation for Reduced Keyboards Using Small Text Samples John L. Arnott and Muhammad Y. Javed, University of Dundee, Scotland; Augmentative and Alternative Communication, vol. 8, Sep. 1992, pp. 215–223.

* cited by examiner

Primary Examiner—Crescelle N. dela Torre
(74) Attorney, Agent, or Firm—Terri S. Hughes; Romi N. Bose

(57) ABSTRACT

A data entry apparatus (10) receives a first character key from a keypad (12). A set of characters associated with the first character key is displayed. A second character key from the keypad (12) is received, wherein a second set of characters is associated with the second character key. A character from the first set of characters is combined with a character from the second set of characters. A set of alternative n-grams is displayed, derived from the step of combining, in descending order based on a probability of frequency of use in a given language. When an alternative n-gram is detected as being actively highlighted, the n-gram is locked to create a locked n-gram and characters associated with subsequent character keys vary in their combinations with respect to the locked n-gram.

29 Claims, 11 Drawing Sheets

| KEYS | NORMAL DISPLAY: | ALTERNATE ROW PRESENT: |
|---|---|---|
| 1 | LAUNCHES ALTERNATE ROW DISPLAY | DISPLAYS: SPACE, 1,0, AND LIST OF PUNCTUATIONN MARKS |
| 2 | LAUNCHES ALTERNATE ROW DISPLAY | DISPLAYS: abc 2 |
| 3 | LAUNCHES ALTERNATE ROW DISPLAY | DISPLAYS: def 3 |
| 4 | LAUNCHES ALTERNATE ROW DISPLAY | DISPLAYS: ghi 4 |
| 5 | LAUNCHES ALTERNATE ROW DISPLAY | DISPLAYS: jkl 5 |
| 6 | LAUNCHES ALTERNATE ROW DISPLAY | DISPLAYS: mno 6 |
| 7 | LAUNCHES ALTERNATE ROW DISPLAY | DISPLAYS: pqrs 7 |
| 8 | LAUNCHES ALTERNATE ROW DISPLAY | DISPLAYS: tuv 8 |
| 9 | LAUNCHES ALTERNATE ROW DISPLAY | DISPLAYS: wxyz 9 |
| * | MOVES THE CURSOR TO THE LEFT | HIGHLIGHTS THE NEXT LEFT CHOICE |
| 0 | -PRESSING ONCE TURNS SHIFT ON<br><br>-PRESSING TWICE TURNS CAPS ON<br><br>-PRESSING AGAIN TURNS SHIFT OFF | -SELECTS THE HIGHLIGHTED CHOICE AND PUTS IT IN THE MESSAGE BODY AREA<br><br>-INSERTS A ZERO IF PRECEDED BY A NUMERIC CHARACTER IN THE ALTERNATIVE ROW DISPLAY |
| # | -MOVES THE CURSOR TO THE RIGHT<br>-INSERTS A SPACE AFTER THE LAST N-GRAM<br>(ONLY IF AT THE END OF THE MESSAGE) | HIGHLIGHTS THE NEXT RIGHT CHOICE |
| OK | NONE | SELECTS THE HIGHLIGHTED CHOICE AND PUTS IT IN THE MESSAGE BODY AREA |
| C | -CLEAR THE LAST CHARACTER ENTRY<br>-PRESSING AND HOLDING WILL CONTINUE CLEARING UNTIL MESSAGE CLEAR. PRESSING AGAIN WILL EXIT OUT OF TEXT ENTRY MODE. | CLEARS THE LAST CHARACTER ENTERED. THE HIGHLIGHTED REMAINDER OF THE CHARACTER (IF ANY) ARE THEN LOCKED AND WILL NOT VARY EVEN WHEN THE OTHER KEYS (2-9) ARE PRESSED. THE PRODUCT CHOICES IN THE ALTERNATE ROW DISPLAY AFTER PRESSING 209 KEYS WILL HAVE THE SAME LOCKED LEFT-MOST PORTION. |

*FIG. 3*

DATA ENTRY APPARATUS HAVING A LIMITED NUMBER OF CHARACTER KEYS AND METHOD

FIELD OF THE INVENTION

The present invention relates generally to a data entry apparatus and method, and in particular, to a data entry apparatus and method having a limited number of character keys.

BACKGROUND OF THE INVENTION

Currently, the common way to enter text messages using a conventional cellular phone keypad is through the multi-tap method. The multi-tap method is a way of using the conventional keypad of a telephone to write text (for address book and/or messages—Global System for Mobile Communications). The multi-tap method requires the user to press the TWO through NINE keys for writing letters, the ONE and ZERO keys for symbols and punctuation, and the ASTERISK and POUND keys for moving the cursor to the left and right. For any of the alphabet letters, the user is required to press the TWO through NINE keys to scroll through the letters and number choices associated with that key. For example, when the TWO key is pressed once, the character "a" is displayed. The second press of the same key (the TWO key) displays the character "b", the third press of the same key displays the character "c" and finally the fourth press of the TWO key displays the number "2".

The multi-tap method has proven (based on user feedback and usability studies) to be a very cumbersome method for text entry since it requires too many key presses. Thus, there exists a need to provide a method and apparatus for efficient text entry using a reduced keypad.

BRIEF DESCRIPTION OF THE DRAWINGS

A preferred embodiment of the invention is now described, by way of example only, with reference to the accompanying drawings in which:

FIG. 3 illustrates a table depicting key assignments for the user interface of FIG. 1 in accordance with the preferred embodiment of the present invention;

DETAILED DESCRIPTION OF THE PREFERRED EMBODIMENT

The present invention provides user interface and usability knowledge/requirements for a data entry apparatus having a limited number of character keys and method, preferably in short message service (SMS) telephones. The present invention allows a user to perform the following functions: write/create an n-gram/sentence; edit a n-gram; edit a portion of a n-gram; insert an n-gram; delete a n-gram/character/sentence/entry; select alternate n-grams; navigate between n-grams in a message; enter punctuation marks and symbols; and toggle between upper and lower case.

Character/Function Keys

Figure 1:
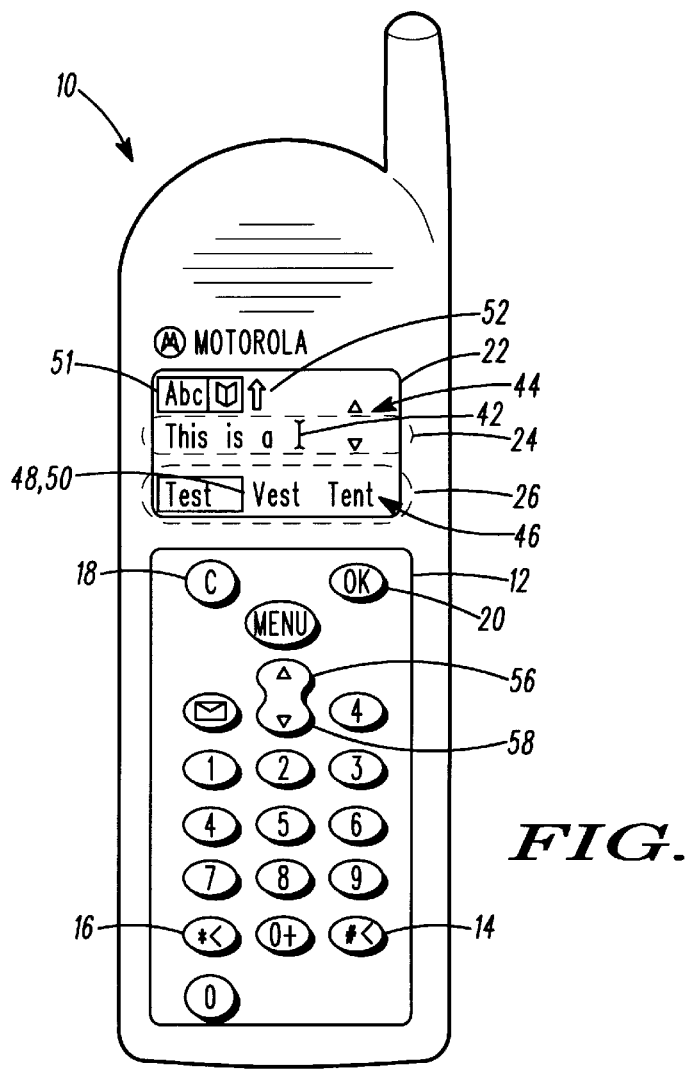
FIG. 1 illustrates a perspective view of a data entry apparatus implementing a graphical user interface in accordance with the preferred embodiment of the present invention.
Figure 2:
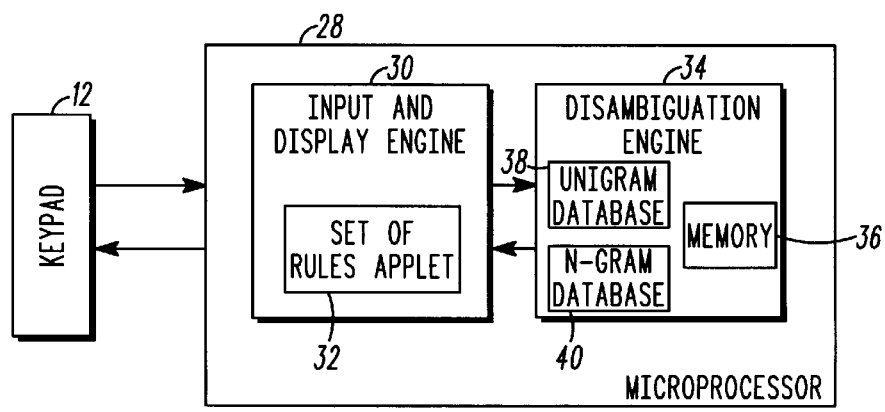
FIG. 2 illustrates a microprocessor on the data entry apparatus of FIG. 1 in accordance with the present invention.

FIGS. 1 and 2 illustrate a data entry apparatus implementing a user interface according to the preferred embodiment of the present invention. The data entry apparatus 10 (e.g., a mobile telephone) comprises a keypad 12 having a set of character keys (ONE through NINE) and function keys 14–20, a graphical user interface (GUI) 22 having a message body area 24 and an alternate row display 26 and a microprocessor 28 having an input and display engine 30, which comprises a set of rules applet 32 and a disambiguation engine 34 having a memory 36, an uni-gram database 38 and an n-gram database 40. The keypad 12 comprises character keys ONE through NINE keys and the following function keys: a ZERO function key, a POUND function key (#) 14 or the like, an ASTERISK function key 16 (*) or the like, a CLEAR function key (C) 18 or the like (e.g., a delete function key) and an OK function key 20 or the like (e.g., select, enter, send, etc.).

As shown in FIG. 3, any of the ONE through NINE character keys launches the alternate row display 26. In addition to launching the alternate row display 26, each of the character keys displays a set of characters. The ONE key displays a space, characters "1" and "0" and a set of punctuation marks. The TWO key displays the characters "a", "b", "c" and "2". The THREE key displays the characters "d", "e", "f" and "3". The FOUR key displays the characters "g", "h", "i" and "4". The FIVE key displays the characters "j", "k", "l" and "5". The SIX key displays characters "m", "n", "o" and "6". The SEVEN key displays the characters "p", "q", "r", "s" and "7". The EIGHT key displays the characters "t", "u", "v" and "8". The NINE key displays characters "w", "x", "y", "z" and "9".

Preferably, the characters are distributed among the character keys in the same manner as on a standard telephone, but could be distributed in any manner. Moreover, in an alternative embodiment, the characters associated with the keys could be ideographic characters or their respective strokes and/or radicals, such as for Kanji characters.

The ZERO function key activates/deactivates the shift function and the caps/upper case function. The ZERO function key also selects the highlighted choice in the alternate row display 26 and places the highlighted choice in the message body area 24, and inserts the character "0" in the alternate row display 26 if preceded by a number.

The POUND function key 14 moves the cursor to the right and inserts a space after the last n-gram (only if at the end of the message).

The POUND function key 14 also highlights the next right n-gram in the message body area 24 and in the alternate row display 26.

The ASTERISK function key 16 moves the cursor to the left. The ASTERISK function key 16 also highlights the next left n-gram in the message body area 24 and in the alternate row display 26.

The CLEAR function key 18 clears the last character entry. Pressing and holding the CLEAR function key 18 continues clearing the character entries until all of the characters in the message body area 24 are deleted. The microprocessor 28 exits out of the text entry mode if the CLEAR function key 18 is pressed after the message body area 24 is clear. In the alternate row display 26, the CLEAR function key 18 clears the last character entered. The highlighted remainder of the characters (if any) are then locked and will not vary even when other keys (TWO through NINE) are pressed (described in detail below—partial n-gram locking). After pressing the TWO through NINE keys, every alternative n-gram in the alternate row display 26 will have the same locked left-most portion.

The OK function key 20 selects the highlighted n-gram to be moved from the alternate row display 26 to the message body area 24. Such an action is also referred to as a n-gram selection mode.

Referring back to FIG. 1, the GUI 22 is divided into the message body area 24 and the alternate row display 26. The message body area 24 functions as a text buffer and has a text buffer cursor 44. The text buffer cursor 44 identifies the position of where the next n-gram will be entered. Preferably, the message body area 24 displays arrows when there are additional lines of text (either on a previous or a next line) in the body of the message if the message contains more than the two lines of text showing.

The alternate row display 26 displays possible n-grams built by a user based on the character keys entered by the user. An n-gram is a probability of usage of a character string of n-characters in a given language. The preferred embodiment of the present invention and the following discussion assumes that the desired language is English, however, the disambiguation engine can be configured to accommodate any desired language. Preferably, the alternate row display 26 displays the alternative n-grams in descending order from the most likely character to be represented by the character key based on a probability of frequency of use in the given language. There is an arrow suggesting availability of more alternative n-grams (if any) on the far right of the alternate row display 26. The alternate row display 26 also has a character entry cursor 48 and a text editing cursor 50, which in FIG. 1 are co-positional at a character entry position following the displayed n-gram "test". These cursors 48, 50 are described in greater detail below.

The input and display engine 30 receives character keys and unction keys from the keypad 12 and controls the display and function of the GUI 22 in accordance with set of rules applet 32.

The disambiguation engine 34 selects, for each character key, a character most likely to be represented by that character key based on frequency of use in the given language. The disambiguation engine 34 further selectively changes, for at least one previous character key, a character most likely to be represented by the previous character key.

The memory 36 stores the set of characters associated with each character key, the functions associated with each function key and a set of rules for the disambiguation engine.

The uni-gram database 38 provides uni-gram information to the disambiguation engine, such as when the first character is entered by the user. The uni-gram database 38 ranks all of the characters in a given language based on frequency of use in the given language.

The n-gram database 40 provides n-gram information to the disambiguation engine 34, such as when characters are combined. The n-gram database 40 ranks all of the n-grams in a given language based on a probability of frequency of use of the combination of characters in the given language.

Alphabetic Entry Mode

In operation, as a user presses the TWO through NINE keys on the keypad 12 to spell a desired n-gram, the desired n-gram is built and displayed in the alternate row display 26. Preferably, the first alternative n-gram (at the far left) is displayed in reverse video and the remaining alternative n-grams are displayed in normal video by default. As shown in FIG. 1, there is an arrow 46 suggesting availability of more alternative n-grams (if any) on the far right of the alternate row display 26. The user scrolls through the alternative n-grams by pressing the POUND function key 14 and/or the ASTERISK function key 16 which highlights the next alternative n-gram to the right or the left depending on whether the POUND function key 14 or the ASTERISK function key 16 is entered. Once a desired n-gram is highlighted (actively or by default) and selected by pressing the OK function key 20 (or the ZERO function key), the input and display engine 30 moves the highlighted n-gram from the alternate row display 26 to the position of the text buffer cursor 44 in the message body area 24. Once the input and display engine 30 moves the highlighted n-gram to the message body area 24, the remaining alternative n-grams in the alternate row display 26 disappear. The alternative n-grams only reappear in the alternate row display 26 when the user presses any of the ONE through NINE keys while in the text entry mode to spell the next desired n-gram.

EXAMPLE 1

Figure 4:
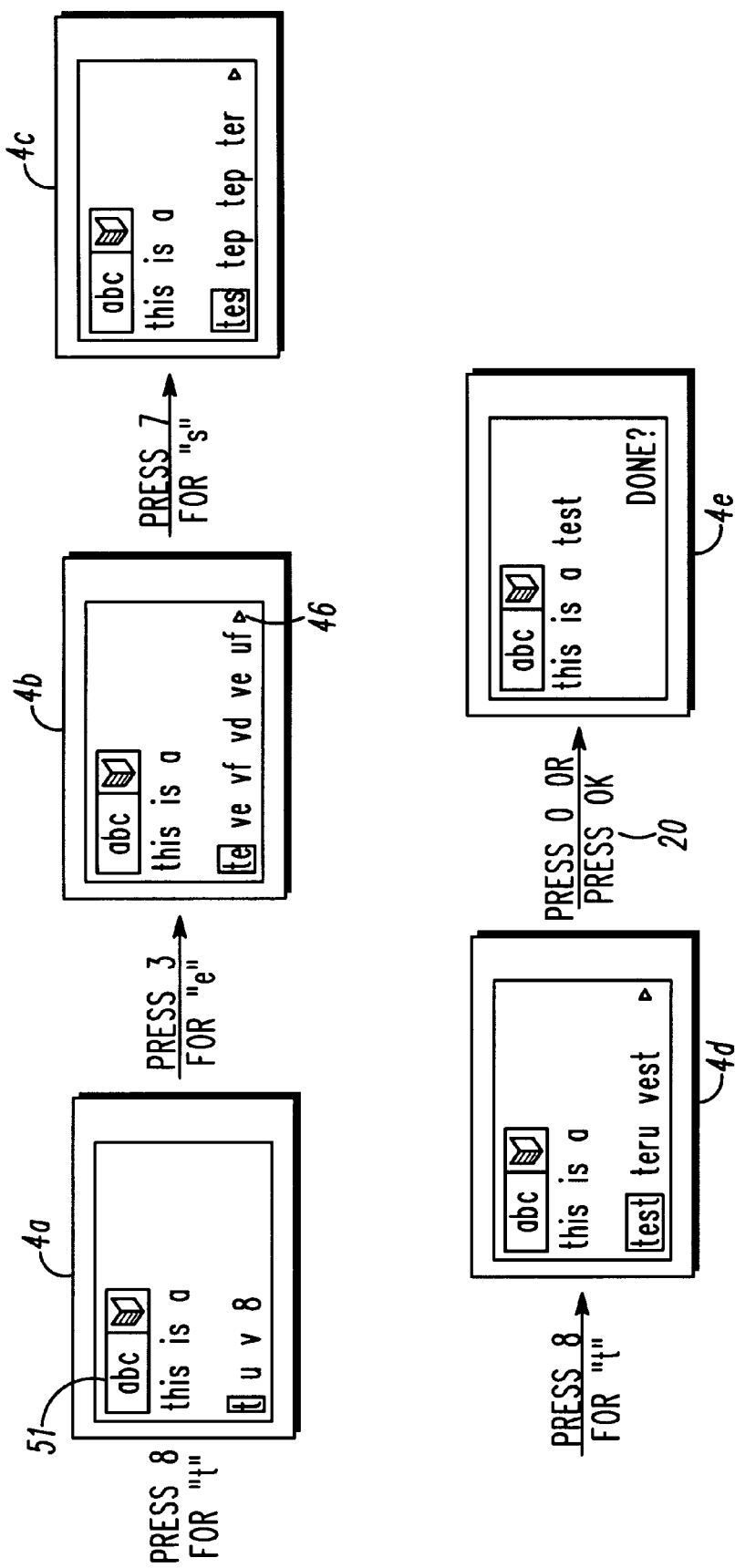
FIG. 4 illustrates a general example of how an n-gram is created in the text entry mode using the user interface of FIG. 1 in accordance with the preferred embodiment of the present invention.

An example of how an n-gram is created in the text entry mode using the user interface is illustrated in FIG. 4. If the desired n-gram is "test", the user presses the EIGHT key for the character "t". When the input and display engine 30 receives the key for the EIGHT key, the disambiguation engine 34 is triggered to identify the set of characters associated with the EIGHT key (t, u, v and 8) from its memory 36. The input and display engine 30 preferably displays the characters associated with the EIGHT key in the alternate row display 26 in the order listed on the keypad 12 as shown in screen 4a. The disambiguation engine 34, however, could perform a look-up function in the uni-gram database 38 and display the characters in descending order based on a probability of frequency of use in the given language.

The user proceeds by pressing the THREE key for the character "e". When the input and display engine 30 receives the character key for the THREE key, the disambiguation engine 34 identifies the set of characters associated with the THREE key (d, e, f and 3) and performs a look-up function in the n-gram database 40. Once the disambiguation engine 34 identifies alternative n-grams based on a combination of the set of characters associated with the EIGHT key and the set of characters associated with the THREE key, the input and display engine 30 displays the alternative n-grams in the alternate row display 26 (te, ve, vf, vd, ve, uf, etc.) as shown in screen 4b. Preferably, unlike the set of characters associated with the first character key, the preferred embodiment displays the alternative n-grams in the alternate row display 26 in descending order based on a probability of frequency of use in the given language.

Moreover, it is preferable to display only "valid" n-grams in the alternate row display 26 (when not using the partial n-gram locking feature described in detail below) in order to reduce the number of alternative n-grams and the amount of memory needed for the data entry apparatus 10. A valid n-gram is a combination of characters that is found in a given dictionary for a given language. For example, "qz" is not a "valid" n-gram, unless entered into the dictionary by the user. Alternatively, the user can set a maximum number of alternative n-grams displayed at a time during a setup procedure In order to reduce the number of alternative n-grams displayed in the alternate row display 26.

The user then presses the SEVEN key for the character "s". When the input and display engine 30 receives the SEVEN key, the disambiguation engine 34 identifies the set of characters associated with the SEVEN key (p, q, r, s and 7) and performs the look-up function in the n-gram database 40. Alternative n-grams are identified based on the sets of characters associated with the EIGHT key, the THREE key and the SEVEN key. The disambiguation engine 34 informs the input and display engine 30 of the updates to the alternate row display 26, and the input and display engine 30 displays the alternative n-grams associated with the EIGHT key, the THREE key and the SEVEN key in combination (tes, tep, ter, etc.) in the alternate row displays as shown in screen 4c.

Finally, the user presses the EIGHT key again for the character "t". When the input and display engine 30 receives the EIGHT key, the disambiguation engine 34 identifies the set of characters associated with the EIGHT key (t, u, v and 8) and performs the look-up function in the n-gram database 40 to identify alternative n-grams. The input and display engine 30 displays the alternative n-grams in the alternate row display 26 (test, teru, vest, etc.) as shown in screen 4d.

After the user finishes entering all of the characters of the desired n-gram, the user highlights the desired n-gram (if not already highlighted) and presses the OK function key 20 (or the ZERO function key). Upon receiving the OK function key 20 (or the ZERO function key), the input and display engine 30 transfers the highlighted n-gram from the alternate row display 26 to the position of the text buffer cursor 44 in the message body area 24 as shown in screen 4e. Simultaneously with the transfer, the input and display engine 30 removes the remaining alternative n-grams from the alternate row display 26. A new set of alternative n-grams does not reappear in the alternate row display 26 until the user activates another character key (ONE through NINE).

Partial N-Gram Locking

The disambiguation engine 34 of the present invention allows for partial n-gram locking as an n-gram is being built in the alternate row display 26. Partial n-gram locking feature allows the user to create n-grams that are not in the dictionary (e.g., compound words, proper names, etc.), but may be partially available. There are two examples described below in which the user can utilize this feature of partial n-gram locking.

EXAMPLE 1

Figure 5:
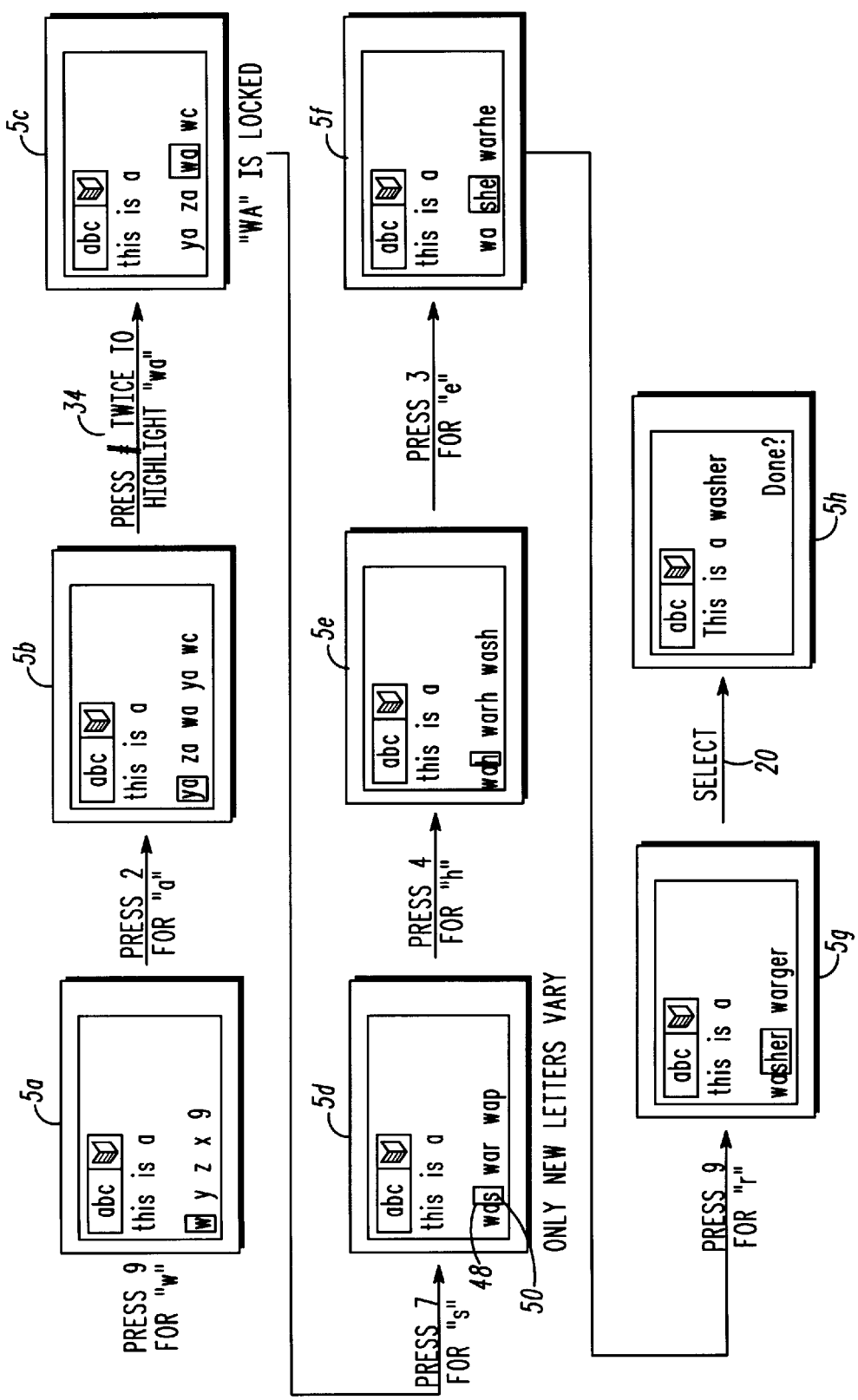
FIG. 5 illustrates a first example of partial n-gram locking in accordance with the preferred embodiment of the present invention.

FIG. 5 is an illustrative example of partial n-gram locking for the desired n-gram "washer" in accordance with the first example. The user presses character keys (TWO through NINE) on the keypad 12 one-by-one that corresponds to the characters of the desired n-gram. First, the user enters the NINE key for the character "w". When the input and display engine 30 receives the NINE key, the disambiguation engine 34 identifies the set of characters associated with the NINE key (w, x, y, z and 9) and informs the input and display engine 30 of the characters in order for the input and display engine 30 to display the set of characters in the alternate row display 26 as shown in screen 5a.

Alternatively, the disambiguation engine 34 performs a look-up function in the uni-gram look-up database to determine which character associated with the NINE key is most commonly used in the given language. After the disambiguation engine 34 determines the ranking of the characters based on a probability of frequency of use in the given language, the input and display engine 30 displays the characters associated with the NINE key (w, y, z, x and 9) in descending order of probability of frequency of use in the given language.

Next, the user enters the TWO key for the character "a". When the disambiguation engine 34 receives the TWO key, it identifies the characters associated with the TWO key (a, b, c and 2). The disambiguation engine 34 performs a look-up function in the n-gram lookup database to determine which characters in combination with the characters associated with the NINE key are alternative n-grams. Once the disambiguation engine 34 identifies the alternative n-grams for the combination of characters associated with the NINE and TWO keys, the input and display engine 30 displays the alternative n-grams in the alternate row display 26 (ya, za, wa, xa and wc) as shown in screen 5b.

When a left-most portion of the desired n-gram (wa) is displayed as one of the alternatives in the alternate row display 26, the user highlights the left-most portion by using the POUND function key 14 (and/or ASTERISK function key 16) as shown in screen 5c. Since the "wa" n-gram is the third n-gram displayed in the alternate row display 26, the user has to press the POUND function key 14 twice in order to highlight the "wa" n-gram. Whenever the input and display engine 30 receives a POUND function key 14, it actively highlights the next right selection. Thus, since the user in this example pressed the POUND function key 14 twice, the input and display engine 30 highlights the "za" n-gram in response to the first POUND function key 14 and then highlights the "wa" n-gram in response to the second POUND function key 14. Note that in the preferred embodiment, the input and display engine 30 automatically highlights the first selection of the alternative n-grams by default, and actively highlights an alternative n-gram in response to the POUND function key 14 or the ASTERISK function key 16. The user can actively highlight the first selection in the alternative n-grams that is already highlighted by default by highlighting the next selection to the right (by pressing the POUND function key 14 once) and then highlighting the first selection (by pressing the ASTERISK function key 16 once). It is important to note that when the input and display engine 30 actively highlights an alternative n-gram in response to a POUND function key 14 or an ASTERISK function key 16, the disambiguation engine 34 "locks" the highlighted n-gram in place, and only subsequent characters corresponding to character keys activated hereafter are varied with respect to the locked portion (in this example, "wa"). The disambiguation engine 34 continually varies characters corresponding to character keys entered after partially-locking the n-gram. The partial n-gram locking feature can be utilized more than once, thus expanding the locked portion as the left-most portion of the desired n-gram is expanded in the alternate row display 26.

As opposed to varying a set of characters corresponding to character keys entered after partially-locking the n-gram, the disambiguation engine 34 can alternatively vary only the set of characters corresponding to the most recently activated character key, thus adding the character that was highlighted prior to activating a subsequent character key to the locked portion. Varying one character at a time by adding each highlighted character to the locked portion is advantageous when entering n-grams that the user knows are not present in the dictionary (e.g., proper names, trademarks, company names, etc.). Varying each additional character also allows the alternate row display 26 to display each character corresponding to the entered character key in combination with the previously locked left-most portion of the desired n-gram.

Next, the user enters the SEVEN key for the character "s". Since the input and display engine 30 received a character key following the POUND function key 14, the disambiguation engine 34 builds on the locked n-gram with the new set(s) of characters entered by the user. Thus, the disambiguation engine 34 identifies the set of characters associated with the SEVEN key (p, r, s and 7). The disambiguation engine 34 provides updates to the input and display engine 30 for the alternate row display 26 by varying each character associated with the SEVEN key in their combination (in reverse video) with respect to the locked portion "wa" in descending order based on a probability of frequency of use in the given language (was, war and wap) as shown in screen 5d. It is important to take notice that "wa" appears as the beginning of every alternative n-gram, hence the phrase "locked portion". Note now, there is a character editing cursor 48 on the left of the highlighted "s" and a character entry cursor 50 on the right of the highlighted "s". The character editing cursor 48 delineates locked characters from non-locked characters within a continuous character string such that further activation of character keys causes generation and display of new characters selected by the disambiguation engine 34 at the character editing cursor 48 within the non-locked characters and such that automatic changing of locked characters by the disambiguation engine 34 is suppressed. Thus, characters to the right of the character editing cursor 48 can be edited and new characters can be entered to the right of the character entry cursor 50.

The user continues with the spelling of the desired n-gram by entering the FOUR key for the character "h". Upon receiving the FOUR key from the input and display engine 30, the disambiguation engine 34 identifies the set of characters associated with the FOUR key (g, h, i and 4) and varies the combination of the characters associated with the SEVEN key and the FOUR key in combination (in reverse video) with respect to the locked portion "wa". The disambiguation engine 34 provides updates to the input and display engine 30 to update the alternate row display 26 with alternative n-grams based on such combinations (wari, warh and wash) as shown in screen 5e. In screen 5e, even though the desired combination "sh" is not highlighted, the desired combination is still present in the alternate row display 26, thus indicating that the disambiguation engine 34 can still successfully recognize the desired n-gram from its n-gram look-up data table.

The input and display engine 30 receives the THREE key. Again, the disambiguation engine 34 identifies the set of characters associated with the THREE key (d, e, f and 3) and varies the combination of the sets of characters associated with the SEVEN key, the FOUR key and the THREE key in combination (in reverse video) with respect to the locked portion "wa". The input and display engine 30 updates the alternate row display 26 with alternative n-grams based on such combinations (washe and warhe) as shown in screen 5f.

The user enters the NINE key to enter the final character of the desired n-gram (r). The disambiguation engine 34 identifies the set of characters associated with the NINE key (w, x, y, z and 9) and varies the combination of the sets of characters associated with the SEVEN key, the FOUR key, the THREE key and the NINE key in combination (in reverse video) with respect to the locked portion "wa". The input and display engine 30 updates the alternate row display 26 with alternative n-grams based on such combinations (washer and warger) as shown in screen 5g.

When the user identifies the desired n-gram "washer" in the alternate row display 26, s/he highlights the desired n-gram (if not already highlighted) by using the POUND function key 14 and presses the OK function key 20 (or the ZERO function key). When the input and display engine 30 receives the OK function key 20, the ZERO function key or any other key that performs a select function, the input and display engine 30 moves the highlighted n-gram from the alternate row display 26 to the position of the text buffer cursor 44 in the message body area 24 as shown in screen 5h.

EXAMPLE 2

Figure 6:
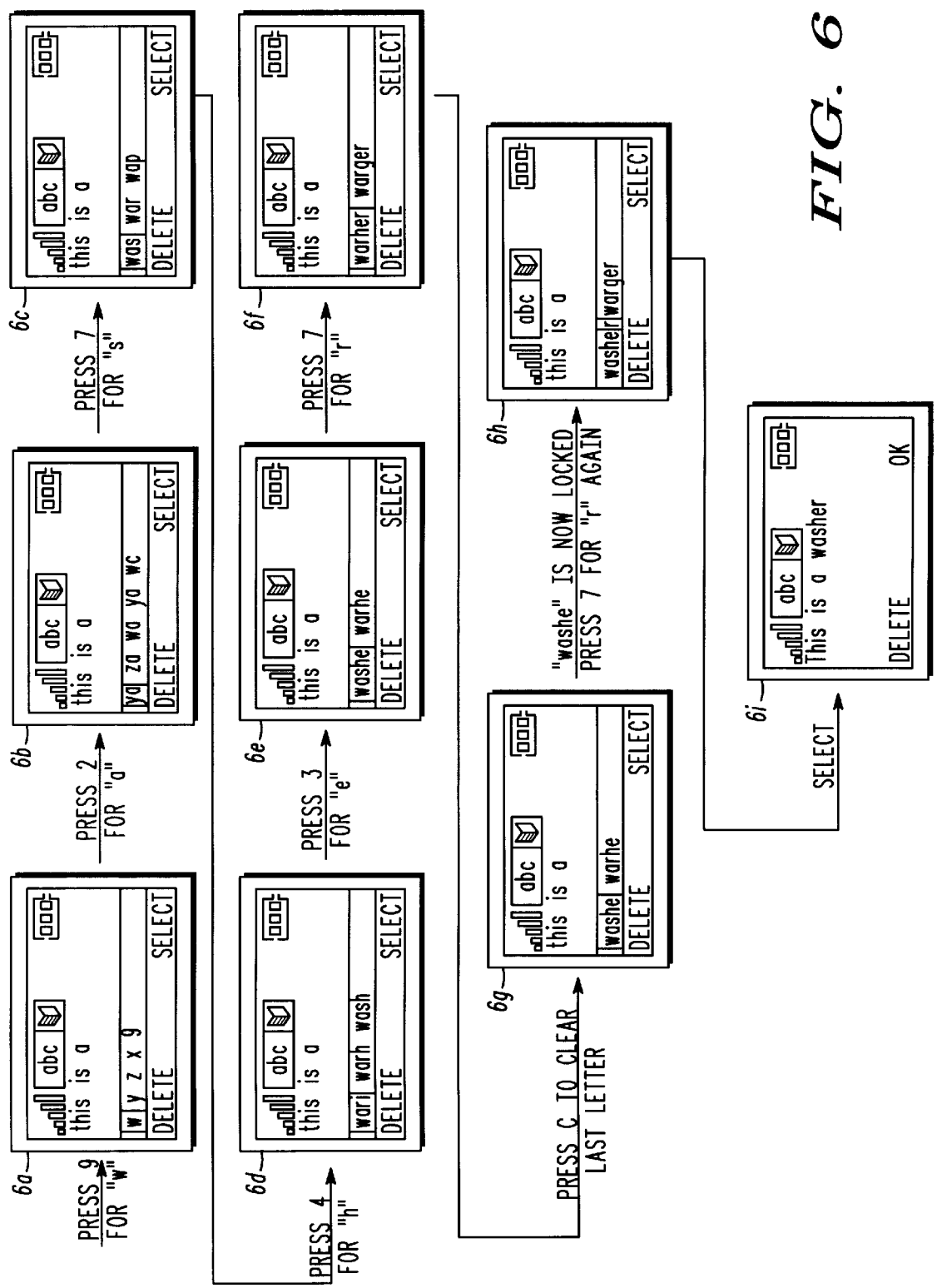
FIG. 6 illustrates a second example of partial n-gram locking in accordance with the preferred embodiment of the present invention.
Figure 7:
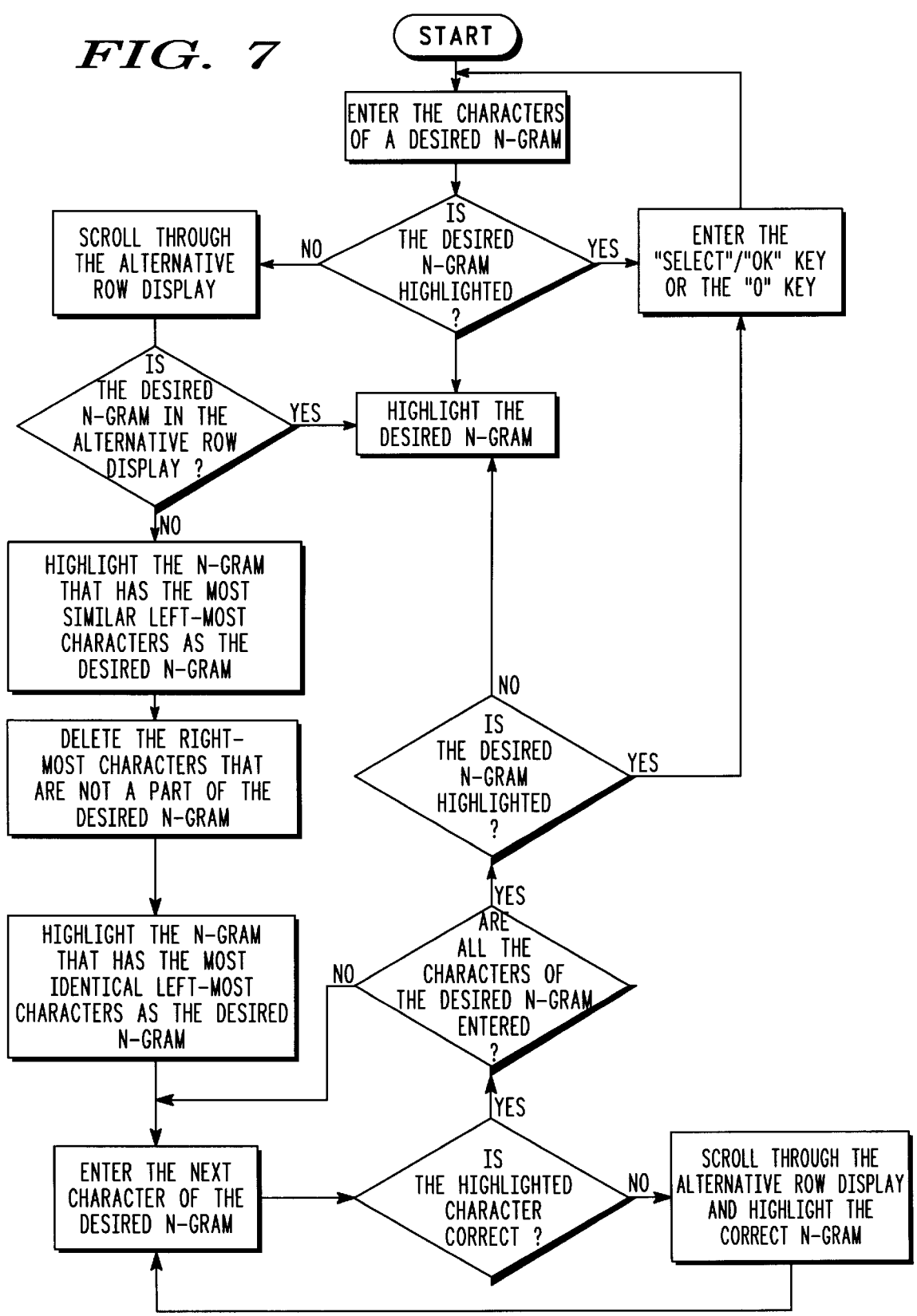
FIG. 7 illustrates a flow chart of FIG. 6 from the perspective of a user in accordance with the preferred embodiment of the present invention.

FIG. 6 is an illustrative example of partial n-gram locking for the desired n-gram "washer" in accordance with the second example. FIG. 7 illustrates a flow chart of FIG. 6 from the perspective of a user. For ease of comparing the first example with the second example, the desired ngram is the same (washer). In the second example, the user begins entering the characters that make up the desired n-gram by pressing their corresponding character keys. As shown in screens 6a–6f, the user presses the NINE key for the character "w", the TWO key for the character "a", the SEVEN key for the character "s", the FOUR key for the character "h", the THREE key for the character "e" and the SEVEN key for character "r". In response to each character entry, the disambiguation engine 34 identifies the set of characters associated with the character key and informs the input and display engine 30 of the alternative n-grams generated from the combination of the sets of characters. The input and display engine 30 updates the alternate row display 26 with alternative n-grams after each character entry as shown in the alternate display area 26 of each screen 6a through 6f.

When the user goes to select the desired n-gram from the alternate row display 26, s/he notices that the n-gram displayed in the alternate row display 26 no longer match the intended combination. The user enters the CLEAR function key 18 to delete the last entry(s) until reaching the point where a matching portion of the intended n-gram is displayed again. For each CLEAR function key 18 entered, the disambiguation engine 34 deletes the most recent character entered at the character entry cursor and provides the input and display engine with the updated list of alternative n-grams.

In this example, the user enters the CLEAR function key 18 once as shown in screen 6g. The disambiguation engine 34 deletes the last set of characters (p, r, s and 7) corresponding to the last character key entered (the SEVEN key) from the possible combinations of alternative n-grams. The disambiguation engine 34 provides updates to the input and display engine 30 for the alternate row display 26 by displaying the alternative n-grams displayed to the user before the user entered the SEVEN key.

After the disambiguation engine 34 removes the last set of characters from the possible combinations of alternative n-grams, the user identifies the left-most portion of the desired n-gram in the alternate row display (i.e., washe) as shown in screen 6g. The user actively highlights the left-most portion of the desired n-gram (if not already highlighted) and continues re-entering the remaining characters. The "washe" becomes locked and only the characters corresponding to the SEVEN key (p, r, s and 7) are varied in combination (in reverse video) with respect to the locked portion as shown in screen 6h. The input and display engine 30 displays the characters corresponding to the SEVEN key in combination with the locked portion (washer, washes).

The user highlights the desired combination (if not already highlighted) and presses the OK function key 20 (or the ZERO function key). In response to the OK function key 20 (or the ZERO function) received, the input and display engine 30 moves the highlighted n-gram from the alternate row display 26 to the position of the text buffer cursor 44 in the message body area 24 as shown in screen 6i.

Numeric Value Entry

At this point, let us turn the discussion to adding numerical values. When the user presses any of the ONE through NINE keys, s/he is presented with a corresponding number as one of the choices in the alternate row display 26. Once the user highlights the numeric character in the alternate row display 26, subsequently pressing any of the numbered keys (ZERO through NINE) adds only the numeric character in the alternate row display 26 and not an alphabet character. Once the desired number is created and selected by pressing the OK function key 20 (while in the numeric mode, the ZERO function key does not function as a select key, but rather its face value), the input and display engine 30 defaults back to the alphabetic entry mode for displaying choices in the alternate row display 26.

Figure 8:
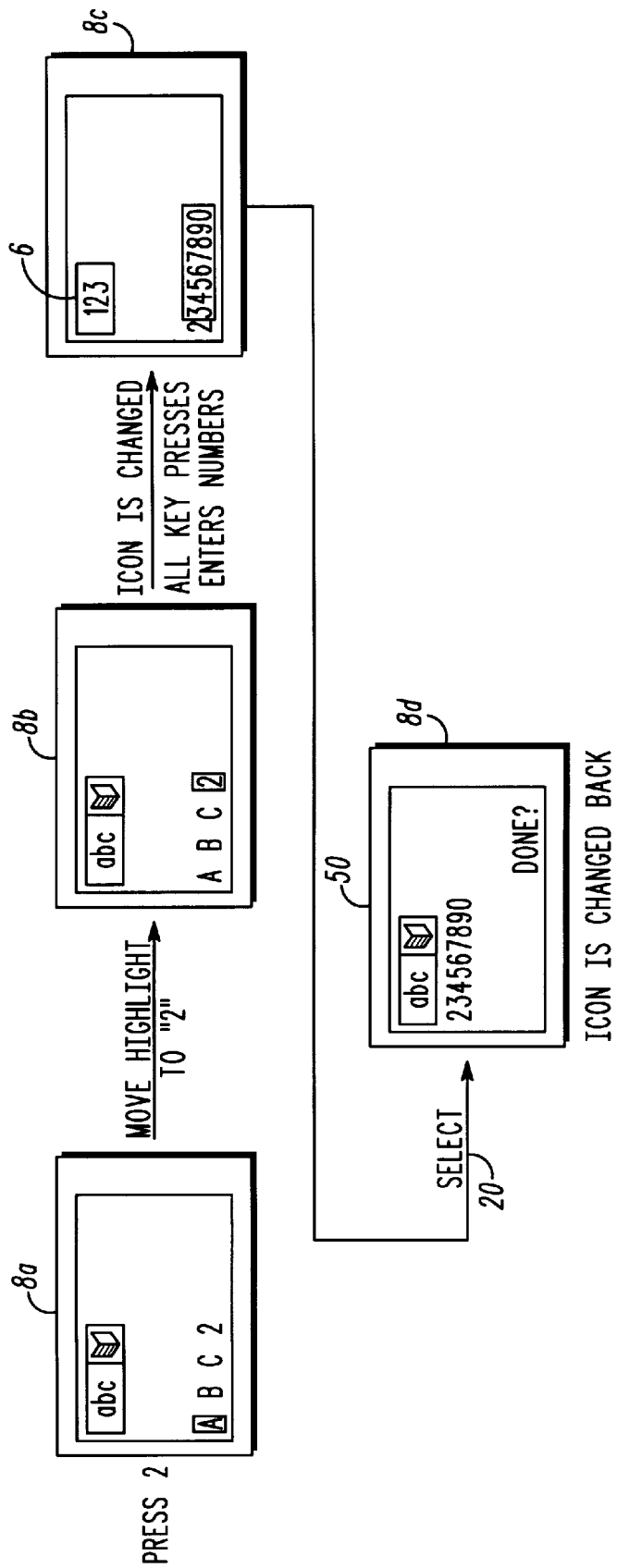
FIG. 8 illustrates an example of the numeric character entry in accordance with the preferred embodiment of the present invention.

FIG. 8 illustrates an example of the numeric character entry. When the user enters the TWO key, the disambiguation engine 34 identifies the set of characters associated with the TWO key (a, b, c and 2). Once identified, the input and display engine 30 displays the characters to the user in the alternate row display 26 as shown in screen 8a.

Since the desired n-gram is a numeric character, the user highlights the character "2" by pressing the POUND function key 14 three times as shown in screen 8b. In response to receiving the POUND function key 14 three times, the input and display engine 30 highlights the third n-gram to the right of the already highlighted n-gram. Remember from the discussion above, when the input and display engine 30 highlights an n-gram in response to receiving a POUND function key 14 or an ASTERISK function key 16, the highlighted n-gram becomes locked. Thus, the disambiguation engine 34 locks the numeric character "2". When the disambiguation engine 34 locks the numeric character, the disambiguation engine 34 assumes that all subsequent character key entries are numeric and defaults to a numeric entry mode. In response, the disambiguation engine 34 combines subsequent numeric characters associated with character keys entered by the user with the locked character as shown in screen 8c.

Once the user creates and selects the desired numeric characters with the OK function key 20, the input and display engine 30 moves the desired numeric characters to the position of the text buffer cursor 44 in the message body area 24 as shown in screen 8d. After the desired numeric characters are entered in the message body area 24, the alternate row display 26 is cleared and the input and display engine 30 preferably defaults back to the alphabetic entry mode.

Graphical Feedback

Preferably, icons and graphical feedback from the user interface provides the user with the following feedback: feedback when toggling alphanumeric choices (iconic); feedback when toggling between upper case, lower case, numeric and ideographic (iconic); feedback when input error occurs (auditory—high pitch beep and/or a message dialog); feedback when toggling between modes (text-entry and numeric—iconic); feedback when selecting alternate n-grams (reverse video) and feedback when there are additional lines of text in the message body area 24 or additional alternative n-grams available in the alternate row display 26 (arrows).

For example, FIG. 1 shows an indicator icon 51 in the upper left-hand corner of the GUI 22 that the microprocessor 28 is operating in the alphabetic entry mode. In FIG. 1, there is also an arrow 52 next to the indicator icon 51 pointing upwards which indicates feedback to the user that the first character of the alternative n-grams will be in upper case (also graphically indicated to the user by the letter "Abc" in the indicator icon 51). The indicator icon 51 in FIG. 4, however, does not have the arrow 52 pointing upwards displayed next to it, thus indicating that the alternative n-grams will be in lower case (also graphically indicated to the user by the letters "abc" in the indicator icon 51). In FIG. 8, the indicator icon 51 switches from containing alphabetic characters "abc" (indicating alphabetic entry mode) to containing numbers "123" (indicating numeric entry mode).

Set of Rules Applet

Automatic Space Insertion

After the input and display engine 30 moves an n-gram from the alternate row display 26 to the message body area 24, the input and display engine 30 automatically inserts a space after the n-gram in the message body. The rule of automatic space insertion in the message body area 24 after an n-gram has been entered is stored in the set of rules applet 32 on the input and display engine 30. There are, however, two exceptions to this rule also stored at the set of rules applet 32. The first exception is when the user inserts a punctuation mark (e.g., a period, question mark, etc.). In such cases, the input and display engine 30, depending on the punctuation, may omit inserting the space before and/or after the punctuation mark.

The second exception is when the user moves the text buffer cursor 44 back and forth (by using the POUND function key 14 and/or the ASTERISK function key 16) in the message body area 24 and moves a punctuation mark and/or character from the alternate row display 26 to the position of the text buffer cursor 44 in the message body area 24.

Automatic Shifting

The input and display engine 30 automatically shifts to uppercase for the first character of any given n-gram: (1) at the very beginning of the message; (2) at the beginning of a new sentence (after a selected number of punctuation marks that are followed by a space); and (3) when creating a new address book entry. The automatic shifting is available even when the user moves the text buffer cursor 44 to the beginning of a sentence and inserts a new character in the beginning of the n-gram. The new character is entered in uppercase and the character(s) following the first character switches to lowercase. The user can override this behavior of the input and display engine 30 by pressing the ZERO function key and cycling through the shift modes.

N-gram Completion

The word completion feature allows the user to complete an n-gram without having to enter all corresponding characters. When the user has entered four or more characters for any given n-gram, the input and display engine 30 displays an up-arrow icon 60 on top of the alternative n-grams in the alternate row display for which there are completions available in the n-gram database 40.

Figure 9:
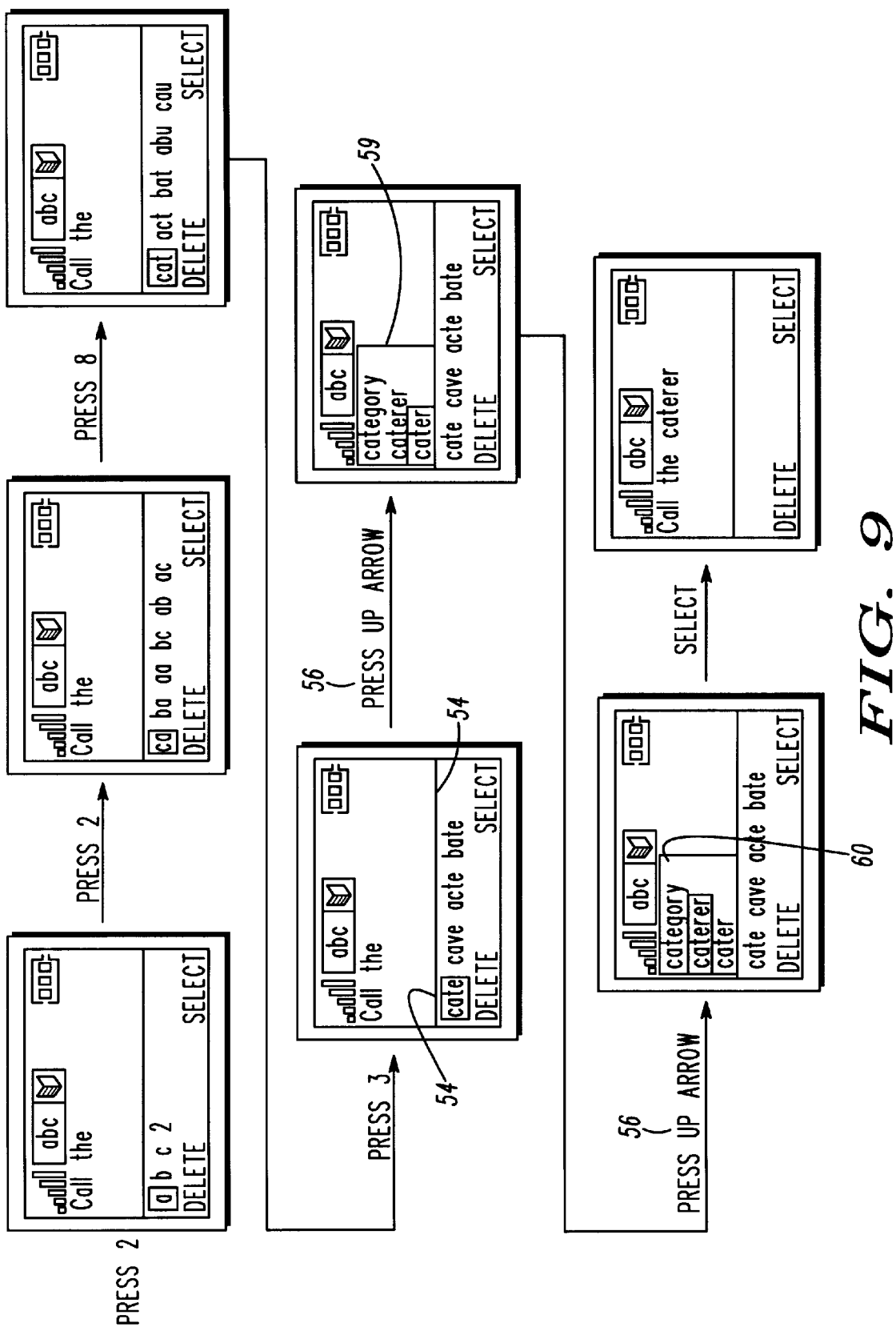
FIG. 9 illustrates an example of n-gram completion according to the preferred embodiment of the present invention.

In the example illustrated in FIG. 9, once the user presses all corresponding keys for the n-gram "cate", the input and display engine 30 places an arrow 54 on top of the alternative n-grams (in this example, "cate" and bate") to suggest availability of various completions for that n-gram. Should the user choose to utilize this feature, s/he would press the up-arrow key 56 on the keypad 12 (see FIG. 1). The input and display engine 30 displays the n-gram(s) that start with the same first four characters in a completed n-gram area 59. Thus, when the user presses the up arrow key 56 while the "cate" n-gram is highlighted, the input and display engine 30 displays cater, caterer and category in the completed n-gram area 59. An arrow 60 located in the completed n-gram area 59 indicates that there are further completed n-grams available from which the user can choose. The user can then scroll through the completed n-gram choices by using the up and/or down arrow keys 56, 58 on the keypad 12 to select the desired n-gram.

In the preferred embodiment, it is preferable for the user to enter four characters before the n-gram completion feature is activated in order to keep the number of completed n-grams to a manageable size. In alternative embodiments, however, the number of characters entered before the n-gram completion feature is activated is user determinable.

Deleting

To delete an n-gram in the message body area 24, the user places the text buffer cursor 44 on the right side of the n-gram and enters the CLEAR function key 18. In response to the user entering the CLEAR function key 18 once, the input and display engine 30 deletes one character at a time. In response to the user entering and holding the CLEAR function key 18 for approximately one-second, the input and display engine 30 erases the entire n-gram. In response to the user continually holding the CLEAR function key 18, the input and display engine 30 deletes one n-gram at a time until there are no n-grams left in the message body area 24. If after the message body area 24 is clear and the user enters the CLEAR function key 18 again, the input and display engine 30 exits out of the text entry mode.

Figure 10A:
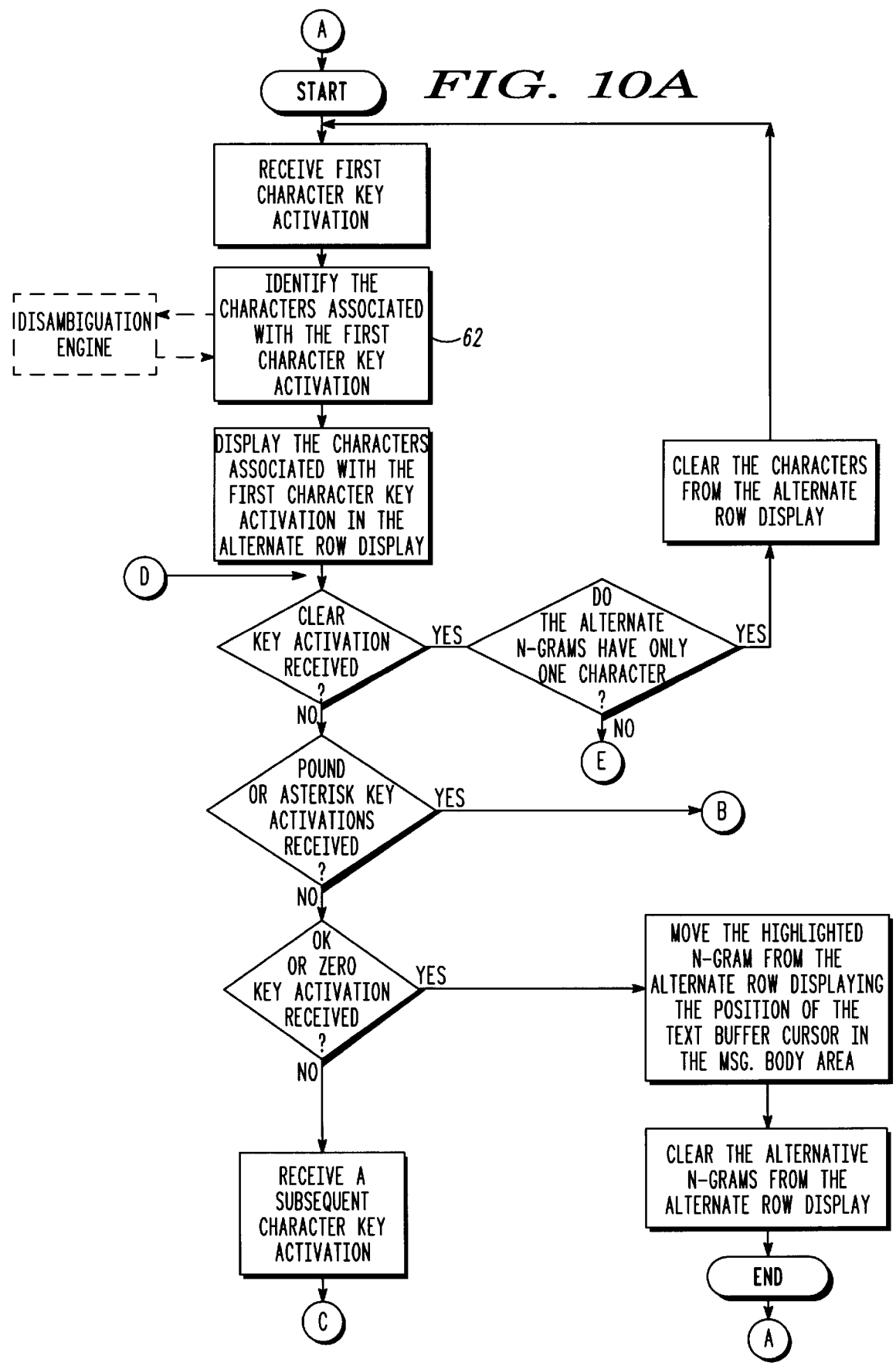
FIGS. 10a–c illustrates a flow chart from the perspective of the microprocessor in accordance with the preferred embodiment of the present invention.
Figure 10B:
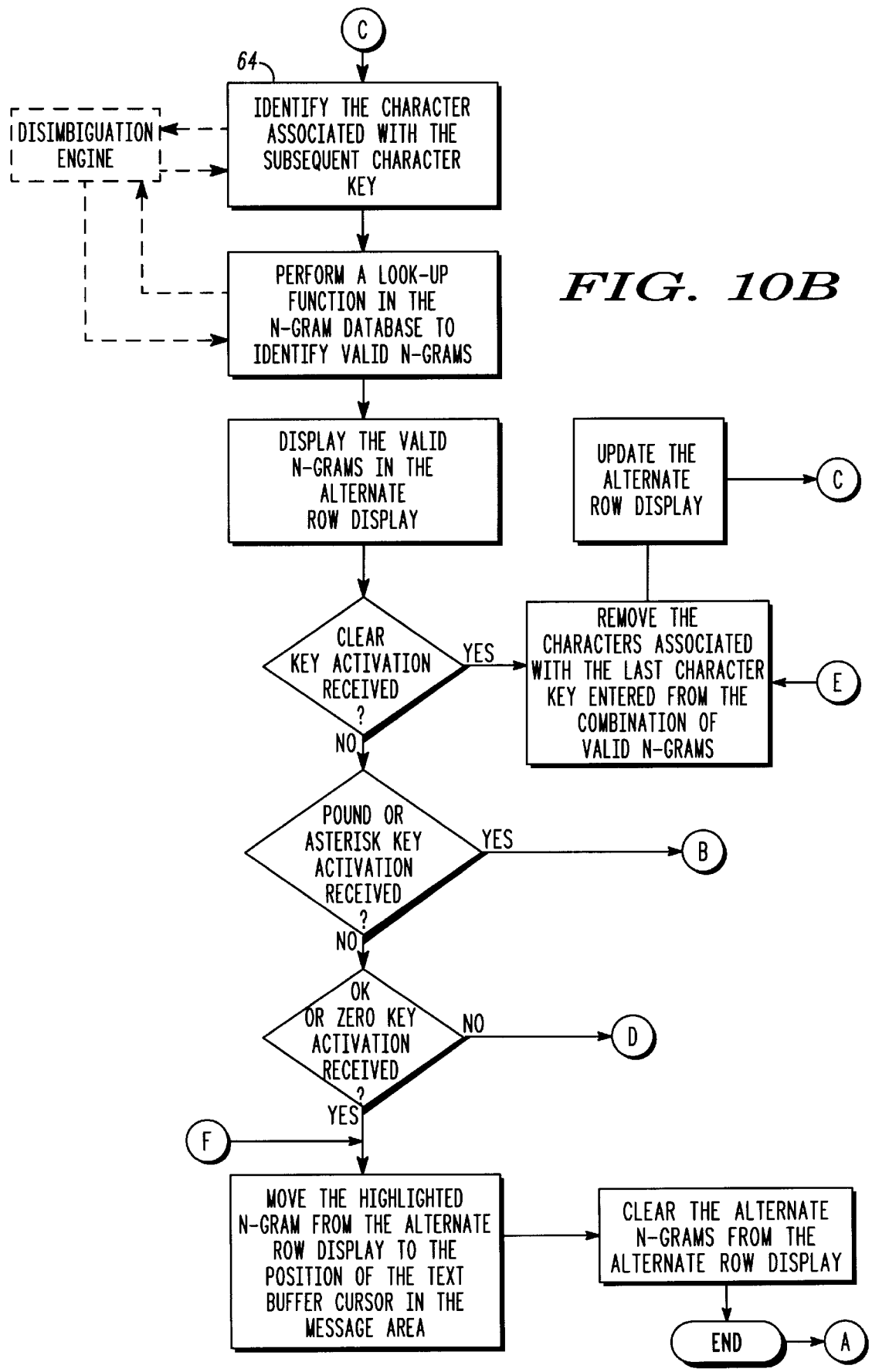
Figure 10C:
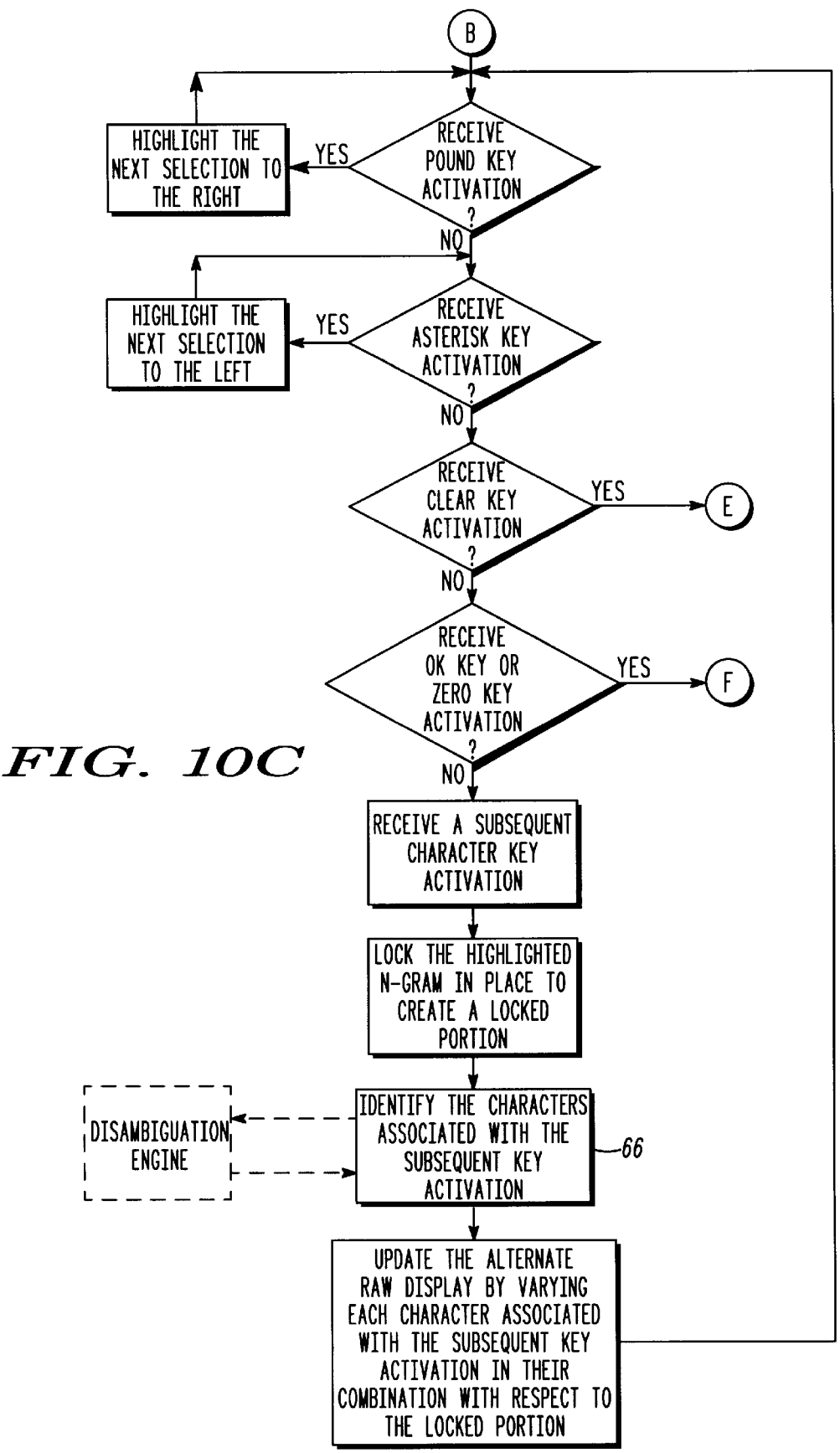

FIGS. 10*a*–10*c* illustrates a flowchart from the perspective of the microprocessor 28, in particular the input and display engine 30, in accordance with the preferred embodiment of the present invention. As indicated by logic blocks 62, 64 and 66, the input and display engine 30 receives identifying information from the disambiguation engine 34; the solid lined logic and decision blocks are performed by the input and display engine 30 and the phantom lined logic blocks are performed by the disambiguation engine 34. In the first identifying step 62, the disambiguation engine 34 preferably performs a look-up function in its memory 36 to identify the characters associated the character key activated by the user. Preferably for the first set of characters corresponding to the first character key received, the disambiguation engine 34 provides the input and display engine 30 with the first set of characters corresponding to the first character key received in the order as they appear to the user on the character key itself. Alternatively, the disambiguation engine 34 provides the input and display engine 30 with the first set of characters corresponding to the first character key received in descending order from the highest probability of usage in the given language. The disambiguation engine 34 obtains such information by performing a look-up function in its memory 36 to identify the first set of characters corresponding to the first character key received. Once the characters are identified, the disambiguation engine 34 performs a further look-up function in the uni-gram database 38 in order to rank each character identified based on the highest probability of frequency of use in the given language.

In the second identifying step 64, the disambiguation engine 34 identifies the set of characters corresponding to the activated character key in the same manner as in the first identifying step 62. In the second identifying step 64, however, the disambiguation engine 34 provides the input and display engine 30 with alternative n-grams derived from a combination of character sets corresponding to the previous character keys activated. The disambiguation engine 34 gathers the alternative n-grams from the n-gram database 40 and passes the information to the input and display engine 30.

In the third identifying step 66, the disambiguation engine 34 identifies the set of characters corresponding to the activated character key also in the same manner as in the first identifying step 62. In the third identifying step 66, however, the disambiguation engine 34 can be configured to generate alternative n-grams in a variety of ways. The disambiguation engine 34 can (1) truncate the locked portion of the n-gram and vary the subsequent set of characters in their combination with respect to the locked portion in the order displayed to the user on the character key; (2) truncate the locked portion of the n-gram and vary the subsequent set of characters in their combination with respect to the locked portion in the order defined by the uni-gram database; or (3) truncate the locked portion of the n-gram at any point (if at all) and vary the subsequent set of characters in their combination with respect to the locked portion in an order defined by the n-gram database 40.

Based upon the teachings of the present invention described in detail and illustrated by examples and figures, particularly FIG. 8, a person of ordinary skill in the art of computer programming can program the microprocessor 28 of any data entry apparatus to perform the present invention.

While the invention has been described in conjunction with a specific embodiment thereof, additional advantages and modifications will readily occur to those skilled in the art. For example, a storage medium (not shown) having stored thereon a set of instructions (or a plurality of instructions—not shown) which, when loaded into the microprocessor 28, causes the microprocessor 28 to perform the functions identified in FIG. 8. For example, the microprocessor 28 can perform the following functions: receive a plurality of character entries in sequence for a desired n-gram from a user; display an alternative row display having a list of alternative n-grams derived from the plurality of characters for the desired n-gram, wherein the list of alternative n-grams is based on a probability of usage of a character string of n-characters in a given language; update the list of alternative n-grams after receipt of each character entry; detect that the user has actively highlighted an n-gram from the list of alternative n-grams; receive an additional character for the desired n-gram; and update the list of alternative n-grams by having the left-most portion of all the n-grams begin with the n-gram that was actively highlighted by the user and varying only a combination of the additional character that was subsequently added to the n-gram that was actively highlighted.

The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. In a data entry apparatus having a graphical user interface, a n-gram database and a keypad having a limited number of character keys, a method comprising:

assigning letters to the character keys on the keypad in a sequential order;

receiving a first character key from the keypad;

displaying a first set of characters associated with the first character key;

receiving a second character key from the keypad, wherein a second set of characters is associated with the second character key;

combining each character from the first set of characters with each character from the second set of characters;

displaying a set of alternative n-grams, derived from the step of combining, in descending order based on a probability of frequency of use in a given language;

detecting that an n-gram is actively highlighted;

locking the n-gram that was actively highlighted to create a locked n-gram; and varying a character associated with subsequent character key entries in its combination with respect to the locked n-gram.

2. A method in accordance with claim 1 further comprising, prior to the step of receiving:

means for allowing a user to delete characters from an actively highlighted n-gram to create an amended n-gram; and processing the amended n-gram as the locked n-gram.

3. A method in accordance with claim 1 wherein a character is one of the following: an alphabet character, an ideographic character, a numeric character and a punctuation character.

4. A method in accordance with claim 1 further comprising moving a selected n-gram to a position of a text buffer cursor in a message body area when a select key is received.

5. A method in accordance with claim 4 further comprising removing the set of alternative n-grams after entering the selected n-gram into the message body area.

6. A method in accordance with claim 5 further comprising displaying a new set of alternative n-grams after receiving a further character entry.

7. A method in accordance with claim 4 further comprising activating a default setting, where when activated, inserts a blank space after the selected n-gram is entered into the message body area.

8. A method in accordance with claim 7 further comprising a further default setting, where when activated, deletes the blank space when a next character entry into the message body area is a punctuation mark.

9. A method in accordance with claim 1 further comprising activating a default setting, where when activated, displays a first character of each alternative n-gram in the set of alternative n-grams in uppercase and displays subsequent characters of each alternative n-gram in lowercase, when starting a new sentence.

10. A method in accordance with claim 1 further comprising:

receiving a function key prior to receiving the first character key; and displaying an icon indicating that a first character corresponding to the first character key will be displayed in uppercase and subsequent characters corresponding to subsequent character keys will be displayed in lower case.

11. A method in accordance with claim 1 further comprising:

receiving a function key prior to receiving the first character key; and displaying an icon indicating that characters of alternative n-gram in the set of alternative n-gram will be displayed in uppercase.

12. A method in accordance with claim 1 further comprising providing graphical feedback on the graphical user interface when toggling between uppercase alphabetic characters, lowercase alphabetic characters, a combination of uppercase and lowercase alphabetic characters and numeric characters.

13. A method in accordance with claim 1 further comprising providing graphical feedback on the graphical user interface when an input error occurs.

14. A method in accordance with claim 1 further comprising providing auditory feedback when an input error occurs.

15. A method in accordance with claim 1 further comprising providing graphical feedback on the graphical user interface when selecting an alternative n-gram.

16. A method in accordance to claim 1 further comprising providing graphical feedback on the graphical user interface when there are additional alternative n-grams not currently displayed on the graphical user interface.

17. A method in accordance to claim 1 further comprising providing graphical feedback on the graphical user interface when there are additional lines of text not currently displayed on the graphical user interface.

18. In a data entry apparatus having a graphical user interface, a n-gram database and a keypad having a limited number of character keys, a method comprising:

assigning letters to the character keys on the keypad in a layout found on standard telephone keypads;

receiving a first character key from the keypad;

displaying a first set of characters associated with the first character key;

receiving a second character key from the keypad, wherein a second set of characters is associated with the second character key;

combining a character from the first set of characters with a character from the second set of characters;

displaying a set of alternative n-grams, derived from the step of combining, in descending order based on a probability of frequency of use in a given language;

detecting that an n-gram is actively highlighted;

receiving a third character key from the keypad; and displaying an updated set of alternative n-grams wherein a left-most portion of each alternative n-gram in the updated set begins with the n-gram that was actively highlighted, and varying only a combination of characters associated with the third character key with respect to the left-most portion.

19. In a data entry apparatus having a graphical user interface, a n-gram database and a keypad having a limited number of character keys, a method comprising:

assigning letters to the character keys on the keypad in a sequential order;

receiving a predetermined number of character keys from the keypad;

displaying a set of characters associated with a character key received, wherein this step of displaying combines a character associated with a most recently received character key with characters associated with previous character keys to create a set of alternative n-grams; and providing graphical feedback in connection with an alternative n-gram to suggest availability of various completions for the alternative n-gram.

20. A method in accordance with claim 19 further comprising, when activated, displaying a list of available completed n-grams identified from an n-gram database for the alternative n-gram.

21. A data entry apparatus having a limited number of character keys comprising:
- a keypad having a set of character keys wherein each character key represents a plurality of characters and wherein the plurality of characters is in a sequential order;
- a display having a character display area and a character entry cursor;
- a disambiguation engine selecting, for a character key received, a character most likely to be represented by that character key, and selectively changing, for a previous character key, a character most likely to be represented by the previous character key;
- a text entry mode of operation in which activation of a sequence of character keys causes generation and display of sequential characters at the character entry cursor; and
- an editing mode of operation in which a text editing cursor is displayed with the sequential characters, wherein the text editing cursor delineates locked characters from non-locked characters within a continuous character string, such that further activation of character keys causes generation and display of new characters selected by the disambiguation engine at the character entry cursor within the non-locked characters and such that automatic changing of locked characters by the disambiguation engine is suppressed.

22. A data entry apparatus in accordance with claim 21 wherein the disambiguation engine comprises n-gram look-up data.

23. A data entry apparatus in accordance with claim 21 wherein the disambiguation engine applies n-gram look-up data to characters associated with a received character key in combination with previous non-locked characters only.

24. A data entry apparatus in accordance with claim 21 further comprising a n-gram selection mode in which activation of a n-gram select key causes character string to be moved from the character display area to another display area on the display.

25. A data entry apparatus in accordance with claim 21 wherein a set of characters becomes locked after a user highlights the set of characters in the character display area.

26. A data entry apparatus in accordance with claim 25 wherein the disambiguation engine applies n-gram look-up data only to characters associated with subsequent character keys in combination with the set of character that is locked.

27. A data entry apparatus in accordance with claim 25 wherein the set of characters that is locked is expanded to include at least one additional character after a further character key is received.

28. A data entry apparatus in accordance with claim 21 further comprising a select key for transferring content from the character display area to another display area on the display.

29. A storage medium having stored thereon a set of instructions which, when loaded into a microprocessor, causes the microprocessor to perform the following functions:
- receive a first character key from a keypad, the keypad comprising a plurality of character keys wherein each character key is assigned a plurality of letters in a sequential order;
- display a first set of characters associated with the first character key;
- receive a second character key from the keypad, wherein a second set of characters is associated with the second character key;
- combine a character from the first set of characters with a character from the second set of characters;
- display a set of alternative n-grams, derived from the step of combining, in descending order based on a probability of frequency of use in a given language;
- detect that an alternative n-gram is actively highlighted;
- locking the alternative n-gram that was actively highlighted to create a locked n-gram; and
- varying characters associated with subsequent character keys in their combinations with respect to the locked n-gram.

* * * * *